US008667004B2

United States Patent
Sharif et al.

(10) Patent No.: US 8,667,004 B2
(45) Date of Patent: Mar. 4, 2014

(54) PROVIDING SUGGESTIONS DURING FORMATION OF A SEARCH QUERY

(75) Inventors: Tariq Sharif, Issaquah, WA (US); Warren G Stevens, Redmond, WA (US); Sebastien Zimmermann, Seattle, WA (US); Sean Lyndersay, Mountain View, CA (US); Amy Adams Placzkiewicz, Kirkland, WA (US); Eric A Vera, Kirkland, WA (US); Jonathan A Gass, Seattle, WA (US); Benjamin N Truelove, Lynwood, WA (US); Sharon Cohen, Redmond, WA (US); Mike Pell, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 735 days.

(21) Appl. No.: 11/947,833

(22) Filed: Nov. 30, 2007

(65) Prior Publication Data

US 2009/0144234 A1 Jun. 4, 2009

(51) Int. Cl.
G06F 17/30 (2006.01)
(52) U.S. Cl.
USPC .......................................... 707/766; 707/802
(58) Field of Classification Search
USPC ................ 707/1, 3, 4, 5, 751, 705, 752–757, 707/722–727, 765–776; 715/226, 225, 223, 715/231, 275
See application file for complete search history.

(56) References Cited

U.S. PATENT DOCUMENTS

| | | | |
|---|---|---|---|
| 6,853,993 | B2 | 2/2005 | Ortega et al. |
| 2002/0198882 | A1* | 12/2002 | Linden et al. .................. 707/10 |
| 2006/0004739 | A1 | 1/2006 | Anthony et al. |
| 2006/0026013 | A1 | 2/2006 | Kraft |
| 2006/0129541 | A1* | 6/2006 | Morgan et al. .................... 707/3 |
| 2006/0167896 | A1 | 7/2006 | Kapur et al. |
| 2006/0248078 | A1* | 11/2006 | Gross et al. ....................... 707/5 |
| 2006/0277248 | A1* | 12/2006 | Baxter et al. ................. 709/201 |
| 2007/0050351 | A1 | 3/2007 | Kasperski et al. |
| 2007/0050728 | A1* | 3/2007 | Vayssiere ...................... 715/780 |
| 2007/0100915 | A1 | 5/2007 | Rose et al. |
| 2007/0106937 | A1 | 5/2007 | Cucerzan et al. |

(Continued)

FOREIGN PATENT DOCUMENTS

GB EP1160686 5/2001

OTHER PUBLICATIONS

"Ultraseek", retrieved on Oct. 8, 2007 at <<http://www.ultraseek.com/product_information/relevancy.html>>, pp. 1-2.

(Continued)

Primary Examiner — Wilson Lee
(74) Attorney, Agent, or Firm — Andrew Sanders; Micky Minhas; Wolfe-SBMC

(57) ABSTRACT

Various embodiments enable information, in addition to textual information, to be presented to a user when the user enters a search query in a search box forming part of a user interface of an application. In one or more embodiments, a Web browser provides a search box in which a user can enter a search query. While the user is entering a search query, the Web browser can communicate with a third-party search provider to receive information, such as non-textual information, which can be presented to the user to assist in formulating their search query. The non-textual information can include images and other visual information of a non-textual nature.

24 Claims, 10 Drawing Sheets

(56) References Cited

U.S. PATENT DOCUMENTS

| | | |
|---|---|---|
| 2007/0162422 A1 | 7/2007 | Djabarov |
| 2007/0208714 A1 | 9/2007 | Ture et al. |
| 2007/0208738 A1* | 9/2007 | Morgan .......................... 707/6 |
| 2007/0219954 A1 | 9/2007 | Ray et al. |
| 2007/0283254 A1* | 12/2007 | Hamzy ........................ 715/533 |
| 2008/0126983 A1* | 5/2008 | Keohane et al. ............. 715/810 |

OTHER PUBLICATIONS

Martins, et al., "Spelling Correction for Search Engine Queries", pp. 12.

"PCT Search Report and Written Opinion", Application No. PCT/US2008/084236, (Mar. 31, 2009), 12 pages.

* cited by examiner

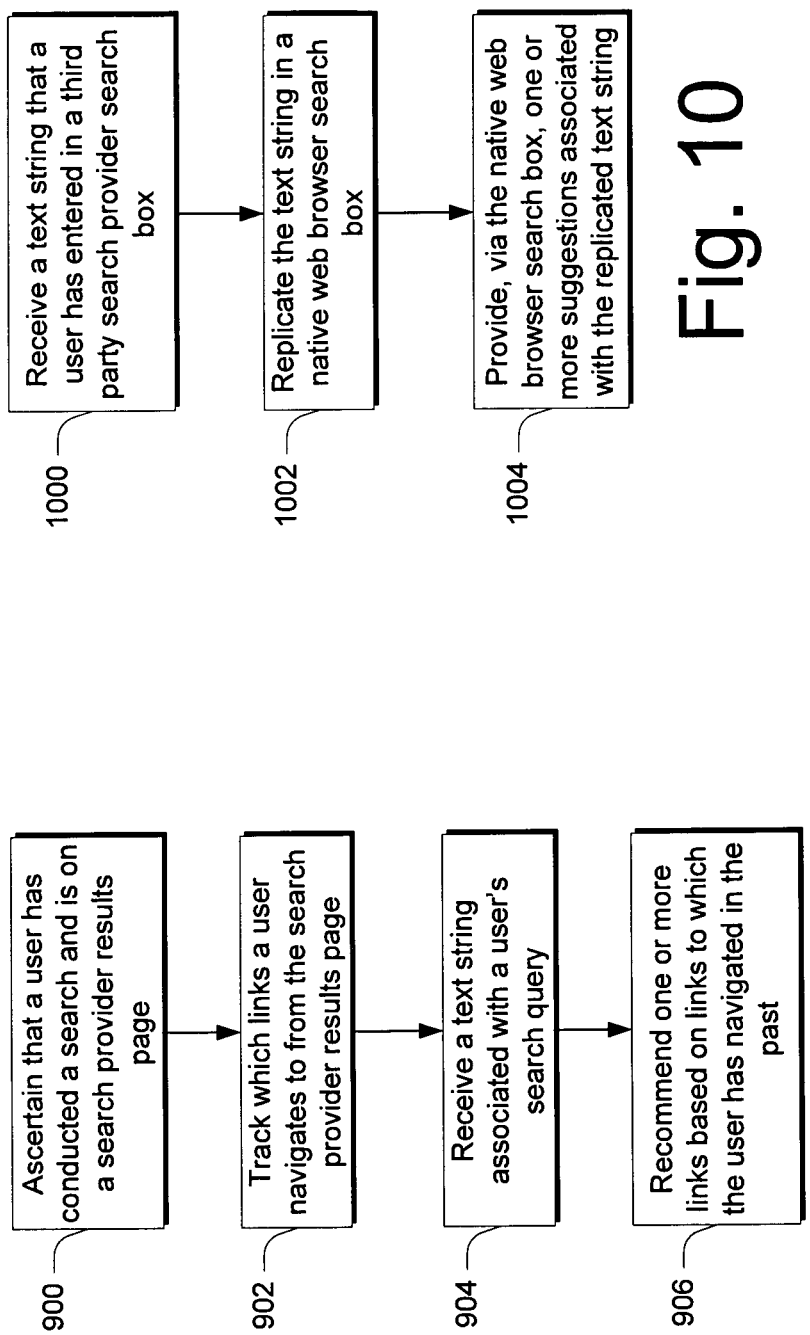

PROVIDING SUGGESTIONS DURING FORMATION OF A SEARCH QUERY

BACKGROUND

When a user types in a search query, such as in a search box provided by their Web browser, search providers as well as the browser have an opportunity to help the user by suggesting relevant information. Typically, this type of functionality is provided through an auto-complete feature. An auto-complete feature generally provides textual information that the search provider believes is relevant to the search query being typed by the user. For example, if a user begins typing the term "Seattle", the auto-complete feature may, after entry of the letters "Sea" suggest search terms such as "Seattle", "Seattle dining", "Seattle Times" and the like.

Although text-based information can be useful for a particular user, providing only text-based information provides a limited user experience.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments enable information, in addition to textual information, to be presented to a user when the user enters a search query in a search box forming part of a user interface of an application. In one or more embodiments, a Web browser provides a search box in which a user can enter a search query. While the user is entering a search query, the Web browser can communicate with a third-party search provider to receive information, such as non-textual information, which can be presented to the user to assist in formulating their search query. The non-textual information can include images and other visual information of a non-textual nature.

In at least some embodiments, non-textual information can be received from a search provider to provide an indication to a user that a search query term may be misspelled. Further, in at least some embodiments, search providers can specify, to a Web browser, parameters that define content that is to be displayed in a search box drop down menu. In at least some embodiments, a content definition is provided using an XML schema that can define how many sections to display, section titles, as well as what to display in each particular section.

BRIEF DESCRIPTION OF THE DRAWINGS

The same numbers are used throughout the drawings to reference like features.

FIG. 9 is a flow diagram that describes steps in a method in accordance with one or more embodiments.

FIG. 10 is a flow diagram that describes steps in a method in accordance with one or more embodiments.

DETAILED DESCRIPTION

Overview

Various embodiments enable information, in addition to textual information, to be presented to a user when the user enters a search query in a search box forming part of a user interface of an application. In one or more embodiments, a Web browser provides a search box in which a user can enter a search query. While the user is entering a search query, the Web browser can communicate with a third-party search provider to receive information, such as non-textual information, which can be presented to the user to assist in formulating their search query. The non-textual information can include images and other visual information of a non-textual nature.

In at least some embodiments, non-textual information can be received from a search provider to provide an indication to a user that a search query term may be misspelled. Further, in at least some embodiments, search providers can specify, to a Web browser, parameters that define content that is to be displayed in a search box drop down menu. In at least some embodiments, a content definition is provided using an XML schema that can define how many sections to display, section titles, as well as what to display in each particular section.

In the discussion that follows, a section entitled "Operating Environment" is provided and describes one environment in which one or more embodiments can be employed. Following this, a section entitled "Providing Non-textual Suggestions" is provided and describes various embodiments in which non-textual suggestions can be provided. Next, a section entitled "Indicating When a Search Term May Be Misspelled" describes embodiments in which misspelled search terms can be brought to the attention of the user. Following this, a section entitled "Specifying Content to Be Displayed in a Search Box" describes embodiments in which third-party search providers can specify content to be displayed in a search box. Next, a section entitled "Suggesting Landing Pages From Previous Searches" is provided in describes embodiments in which suggestions from previous searches can be provided to the user. Lastly, a section entitled "Example System" is provided and describes a system in which various embodiments can be implemented.

Operating Environment

Figure 1:
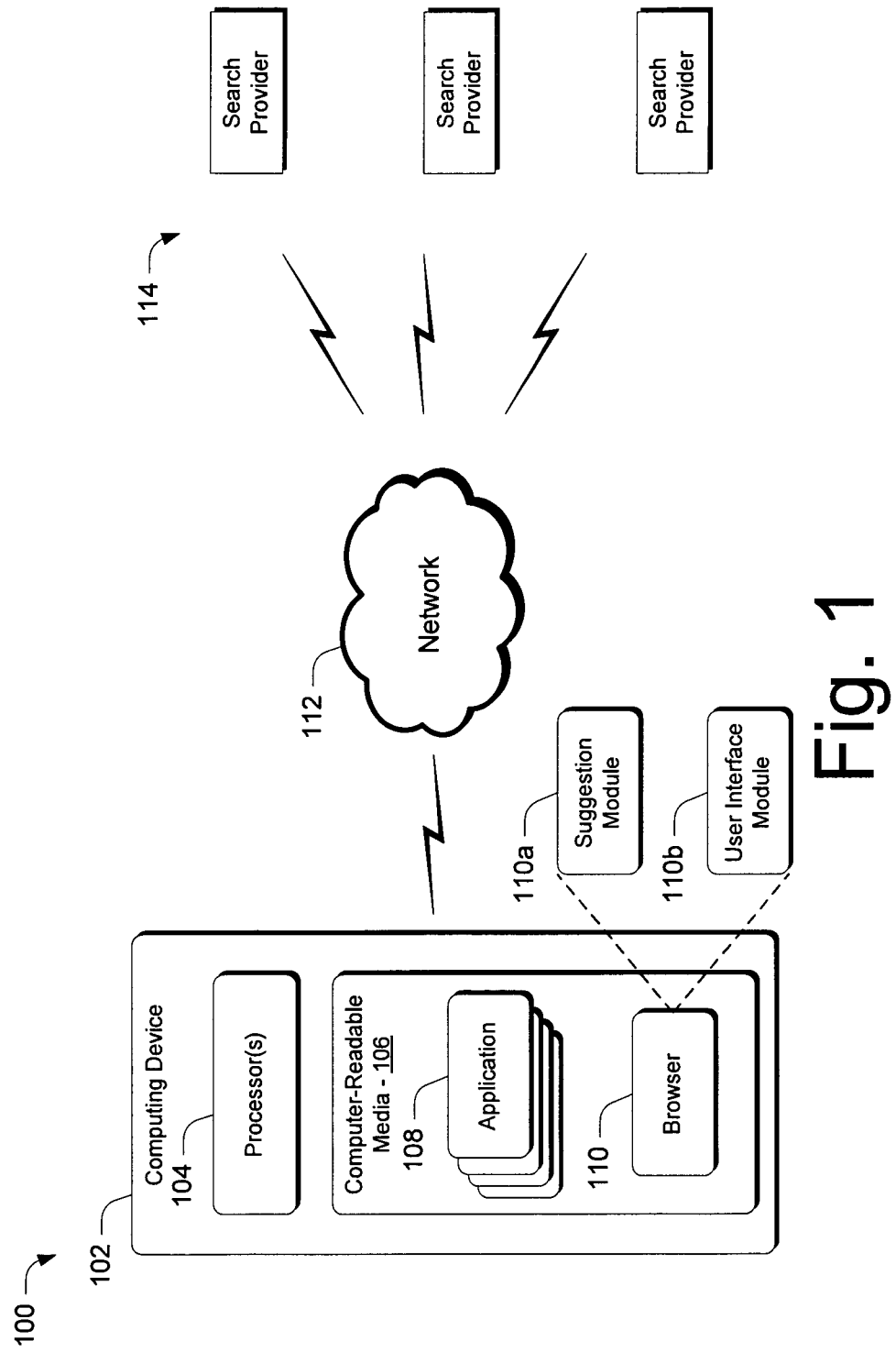
FIG. 1 illustrates a system in which various principles described herein can be employed in accordance with one or more embodiments.

FIG. 1 illustrates an operating environment in accordance with one or more embodiments, generally at 100. Environment 100 includes a computing device 102 having one or more processors 104, one or more computer-readable media 106 and one or more applications 108 that reside on the computer-readable media and which are executable by the processor(s). The computer-readable media can include, by way of example and not limitation, all forms of volatile and non-volatile memory and/or storage media that are typically associated with a computing device. Such media can include ROM, RAM, flash memory, hard disk, removable media and the like. One specific example of a computing device is shown and described below in FIG. 11.

In addition, computing device 102 includes a software application in the form of a Web browser 110. Any suitable Web browser can be used examples of which are available from the assignee of this document and others. In at least some embodiments, Web browser 110 is configured to enable information, in addition to textual information, to be presented to a user when the user enters a search query in a search box. To this end, Web browser 110 includes or otherwise has access to a suggestion module 110a that provides suggestions as described above and below. In addition, Web browser 110 includes a user interface module 110b that is configured to provide a user interface and, in particular, a search box including a drop down menu as described below. In one or more embodiments, the search box comprises a native part of the Web browser.

In addition, environment 100 includes a network 112, such as the Internet, and one or more search providers 114 from and to which content can be received and sent. In operation, while the user is entering a search query in a suitably-configured search box, the Web browser 110 can communicate with a search provider to receive information, such as non-textual information, which can be presented to the user to assist in formulating their search query. As indicated above, the non-textual information can include, by way of example and not limitation, images and other visual information of a non-textual nature, examples of which are provided below.

Computing device 102 can be embodied as any suitable computing device such as, by way of example and not limitation, a desktop computer, a portable computer, a handheld computer such as a personal digital assistants (PDA), cell phone, and the like.

Providing Non-textual Suggestions

Various embodiments enable information, in addition to textual information, to be presented to user when the user enters a search query in a search box forming part of a user interface of an application. In one or more embodiments a Web browser provides a search box in which a user can enter a search query. While the user is entering a search query, the Web browser can communicate with a third-party search provider to receive information, such as non-textual information, which can be presented to the user to assist in formulating their search query. The non-textual information can include images and other visual information of a non-textual nature. The non-textual information can also include text embedded in an image file, such as images that represent text.

Figure 2:
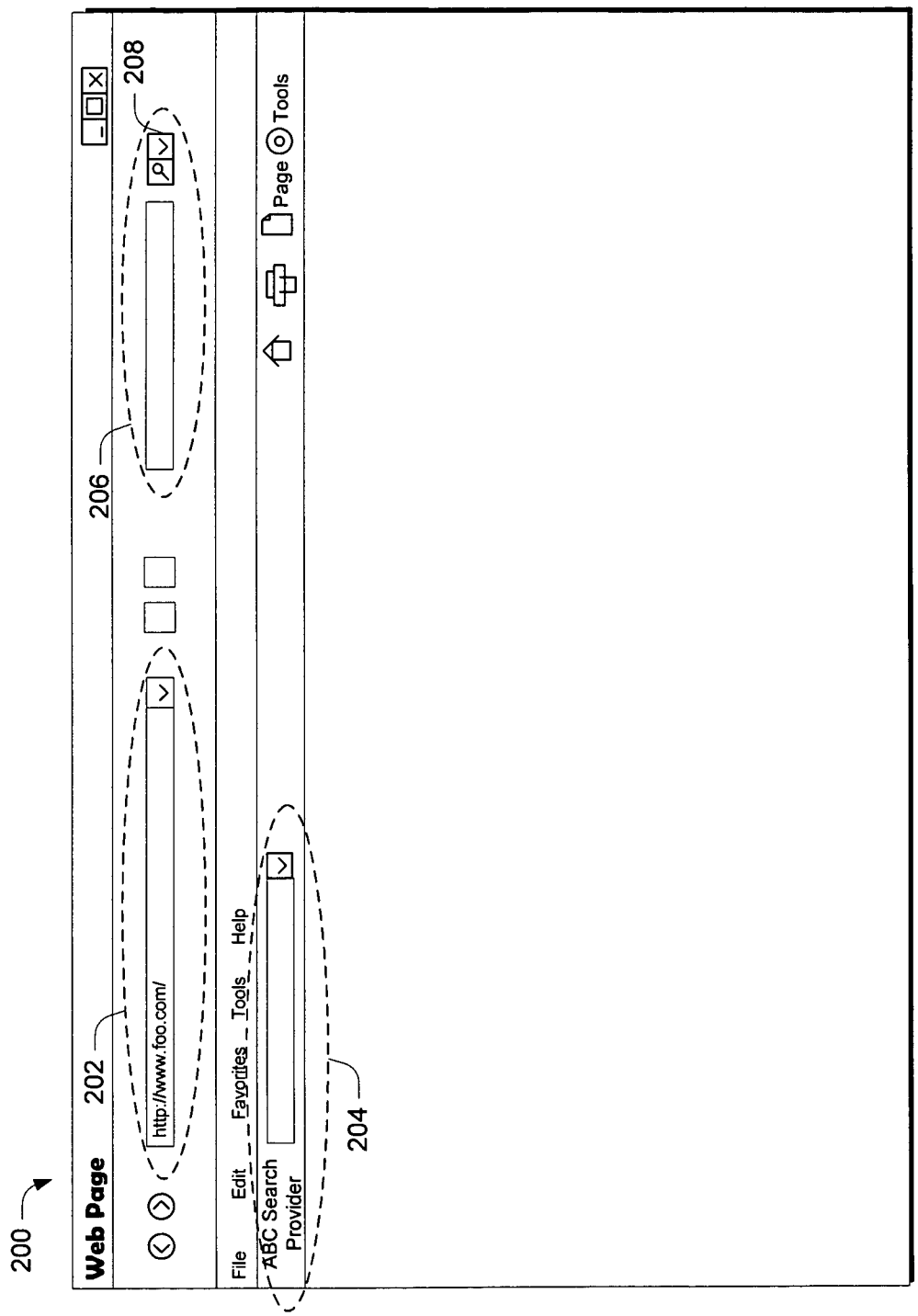
FIG. 2 illustrates a user interface in accordance with one or more embodiments.

As an example, consider FIG. 2. There, an example user interface in the form of a webpage is shown generally at 200. In this example, webpage 200 includes an address bar 202, a third-party search provider search box 204, and a browser-implemented search box 206. Third-party search provider search box 204 is typically provided in the form of a toolbar. In operation, a user can enter a search query in search box 206. The search box 206 includes a drop-down menu feature which can be accessed automatically and/or accessed by a user using a drop-down arrow 208. The drop-down menu can be used to display, for the user, various textual and non-textual information associated with portions of their search query.

Figure 3:
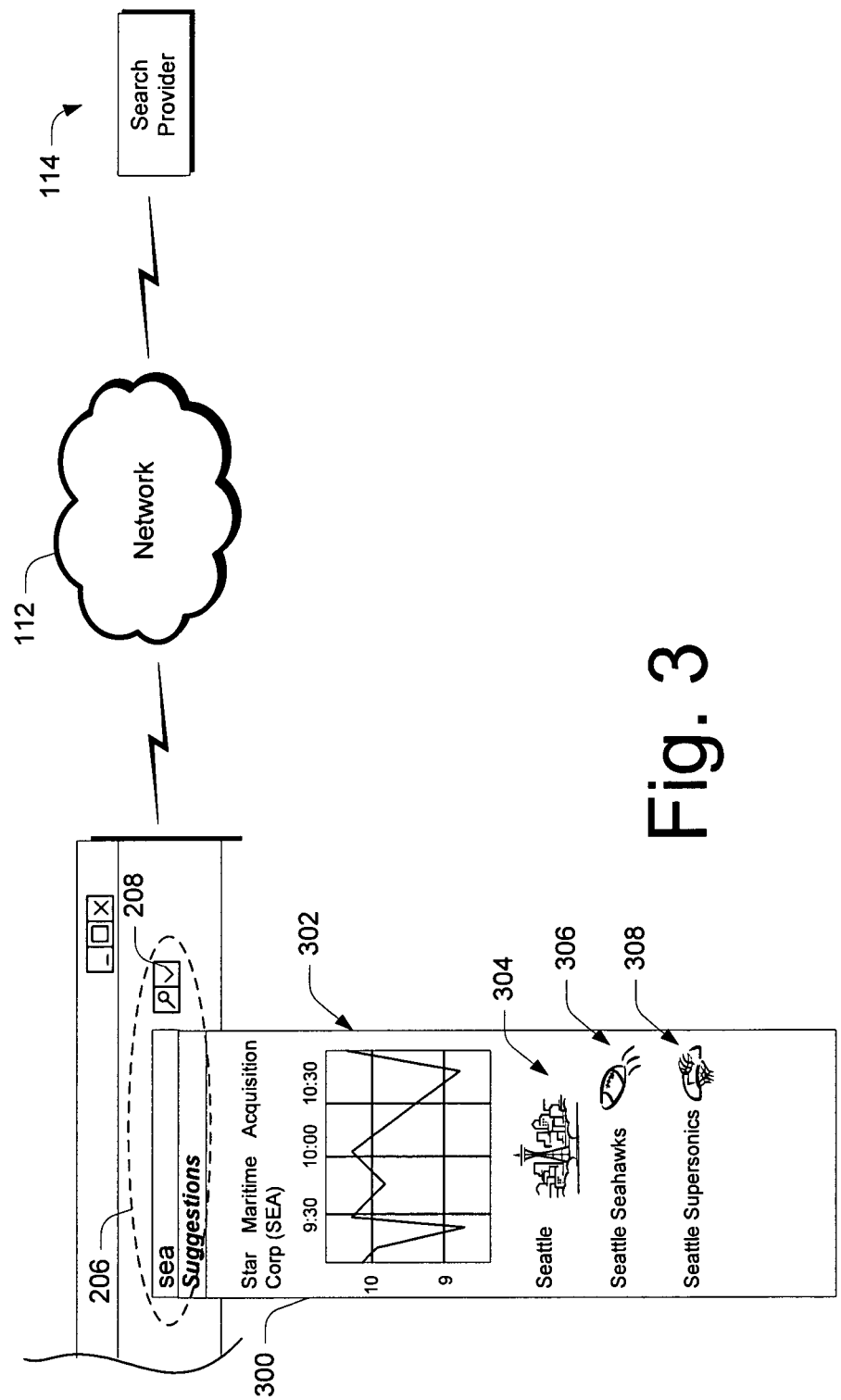
FIG. 3 illustrates a user interface along with a system in accordance with one or more embodiments.

As an example, consider FIG. 3 which illustrates a portion of the user interface of FIG. 2. Specifically, FIG. 3 illustrates search box 206 in which a user has begun to enter a search query in the form of the letters "sea". In this case, assume that the user is in the process of typing "seattle". The search box includes a drop-down menu 300 in which various suggestions can be displayed for the user. While the user is entering a search query, the Web browser communicates the search text—typically portions of the search query—to a search provider 114 via network 112. When the search provider receives the search text sent by the Web browser, it searches for information that can be used to populate drop-down menu 300. The search provider typically has access to various data stores in which it can save information that can be used to populate the drop down menu. When the search provider finds applicable information for a particular search query, it returns the information to the Web browser so that the Web browser can display the information for the user. As discussed above, the information that is returned from the search provider can include not only textual information, but also non-textual information that can be displayed for the user. In this particular example, the search provider has returned both textual information and various images shown generally at 302, 304, 306, and 308. Specifically, in this particular search, the search provider has returned an image 302 in the form of a graph of the stock price for a company called "Star Maritime Acquisition Corp.". Further, the search provider has returned textual suggestions in the form of "Seattle", "Seattle Seahawks", and "Seattle Supersonics" and associated images 304, 306, and 308.

Figure 4:
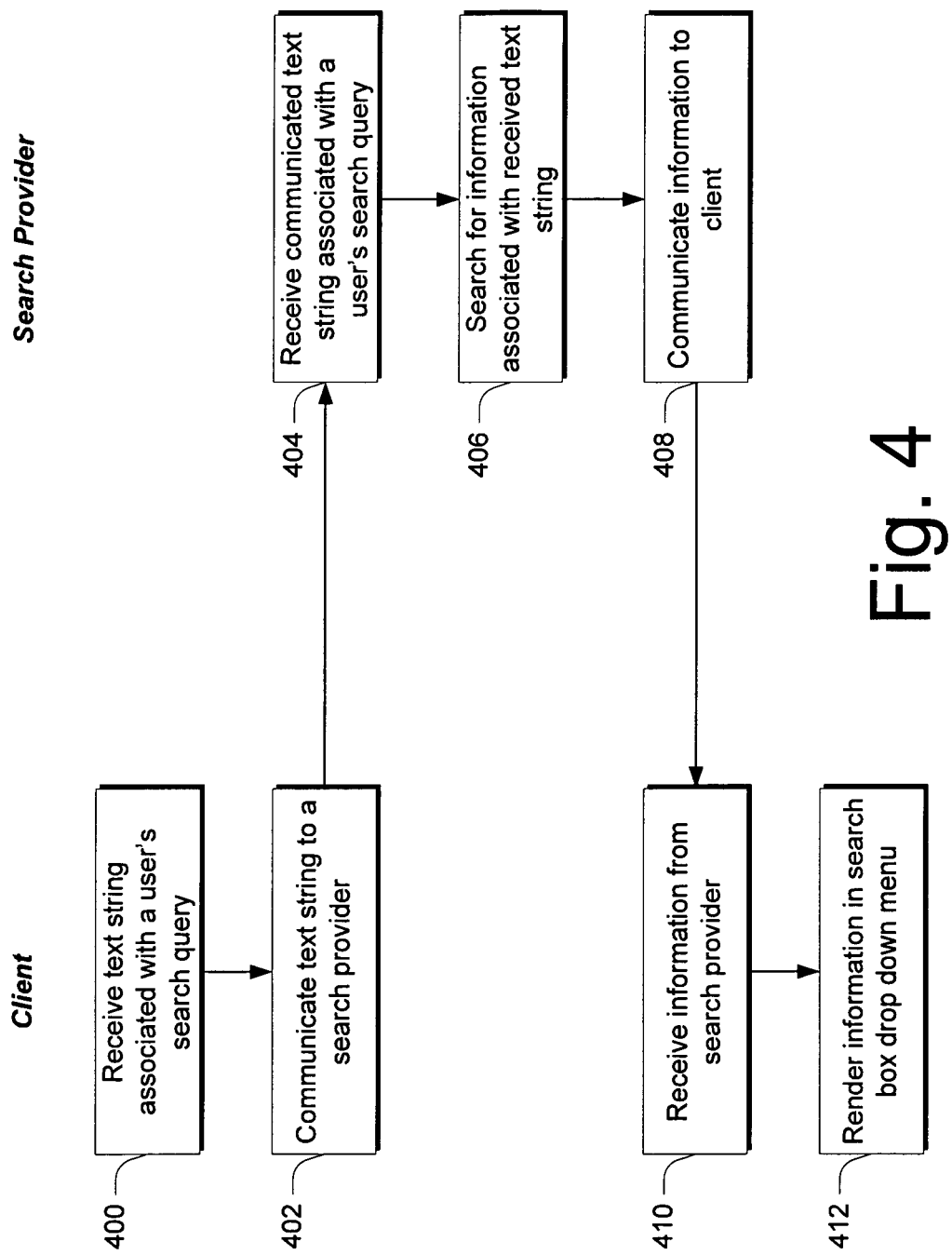
FIG. 4 is a flow diagram that describes steps in a method in accordance with one or more embodiments.

FIG. 4 is a flow diagram that describes steps in a method in accordance with one or more embodiments. The method can be implemented in connection with any suitable hardware, software, firmware or combination thereof. In at least some embodiments, aspects of the method can be implemented by an application, such as a suitably configured Web browser executing on a client device. In addition, aspects of the method can be implemented by one or more search providers. Typically, the search providers are third-party search providers accessible via a suitable network such as the Internet.

Step 400 receives a text string associated with a user's search query. In one or more embodiments, this step is performed, at least in part, using a search box that comprises part of a Web browser. In one or more embodiments, the search box comprises a native part of the Web browser. That is, in these embodiments, the search box functionality is not provided by a separately-installed tool bar mechanism. In addition, the text string can include less than an entire portion of a user's search query. One example of a suitable search box is described above in connection with FIGS. 2 and 3.

Step 402 communicates the text string to a search provider. This step can be accomplished in any suitable way using any suitable protocol. In at least some embodiments, this step is performed by communicating the text string to the search provider via a network such as the Internet.

Step 404 receives the communicated text string associated with the user's search query. Step 406 searches for information associated with the received text string. This step can be performed in any way. For example, the step can be performed by searching for non-textual information associated with the received text string. Alternately or additionally, the step can be performed by searching for textual information as well as non-textual information. Further, this step can be performed by searching for information associated with a particular user and/or by searching for information across a collection of users. For example, with respect to searching for information associated with a particular user, if the text string communicated from the client in step 402 includes information that identifies a particular user or client device, the search can be performed with respect to that particular user or client device. Identifying information can include, by way of example and not limitation, one or more cookies associated with the particular user or client device.

Step 408 communicates the information to the client. The step can be performed in any suitable way using any suitable protocol. In addition, the information can be communicated to the client using any suitable format. But one example of a suitable format is provided below in the section entitled "Specifying Content to Be Displayed in a Search Box".

Step 410 receives the information communicated from the search provider. Step 412 renders the information in a search box drop down menu. One example of how this can be done as provided above in connection with FIG. 3.

Indicating when a Search Term may be Misspelled

Figure 5:
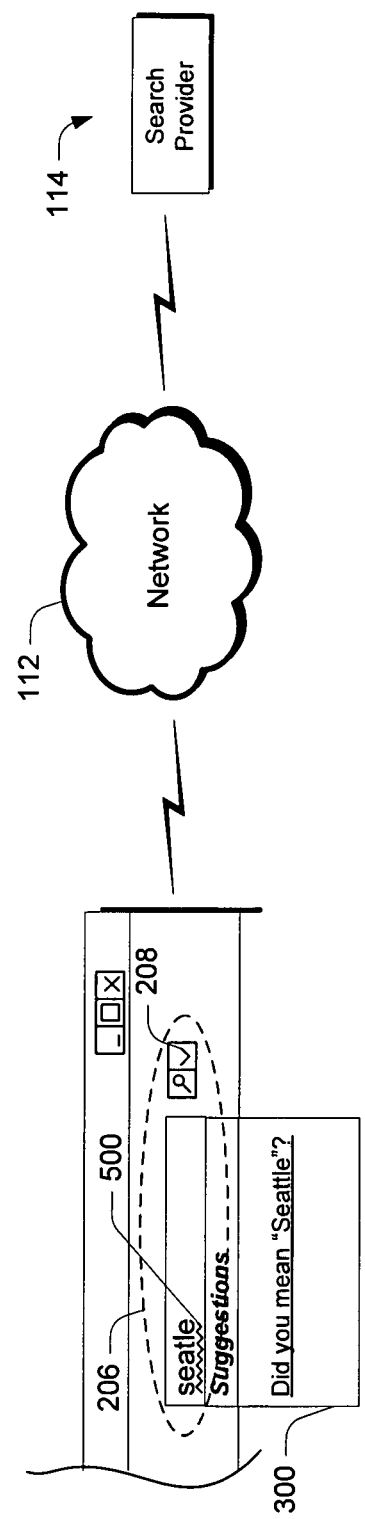
FIG. 5 illustrates a user interface along with a system in accordance with one or more embodiments.

In at least some embodiments, non-textual information can be received from a search provider to provide an indication to a user that a search query term may be misspelled. As an example, consider FIG. 5. There, a user has attempted to type in the search term "Seattle". In this particular instance, however, the user has misspelled the search term. Accordingly, when the associated text string "seatle" is communicated to the search provider 114, the search provider can ascertain that the search term has been misspelled and can return, to the user or client device, information associated with the search term. In this example, such information can include non-textual information, such as markup, to indicate that a search term has been potentially misspelled. In the figure, the non-textual information is represented by a squiggly line 500 that appears just beneath the search term. Any suitable non-textual information can be provided. For example, the non-textual information can include color-coded information, such as a colored highlight to indicate that a search term has been potentially misspelled. In addition, such information can include textual information such as a suggestion of a correct spelling of a potentially misspelled word. In the present example, this textual information appears in the form of the question "Did you mean 'Seattle'?"

In this manner, a user can be provided with both textual and non-textual information to identify potentially misspelled search terms. If a search term has been misspelled, then in at least some embodiments, a user can click on an associated link at which time the correctly-spelled search term can be communicated to the search provider who can then return appropriate suggestions, such as those suggestions shown and described in FIG. 3.

Figure 6:
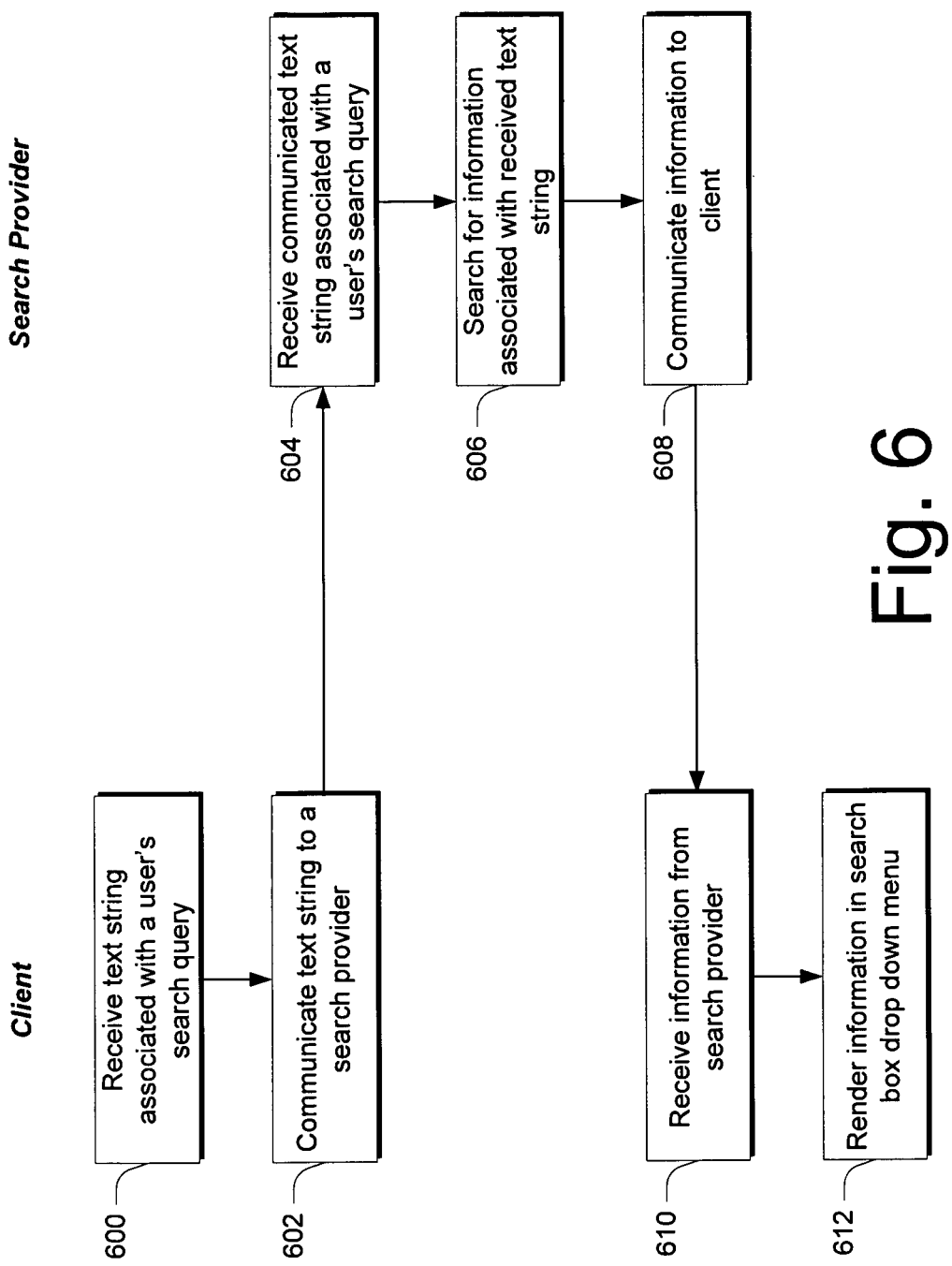
FIG. 6 is a flow diagram that describes steps in a method in accordance with one or more embodiments.

FIG. 6 is a flow diagram that describes steps in a method in accordance with one or more embodiments. The method can be implemented in connection with any suitable hardware, software, firmware or combination thereof. In at least some embodiments, aspects of the method can be implemented by an application, such as a suitably configured Web browser executing on a client device. In addition, aspects of the method can be implemented by one or more search providers. Typically, the search providers are third-party search providers accessible via a suitable network such as the Internet.

Step 600 receives a text string associated with a user's search query. In one or more embodiments, this step is performed, at least in part, using a search box that comprises part of a Web browser. In one or more embodiments, the search box comprises a native part of the Web browser. That is, in these embodiments, the search box functionality is not provided by a separately-installed tool bar mechanism. In this example, the text string can represent a potentially misspelled search term. One example of a suitable search box is described above in connection with FIG. 5.

Step 602 communicates the text string to a search provider. This step can be accomplished in any suitable way using any suitable protocol. In at least some embodiments, this step is performed by communicating the text string to the search provider via a network such as the Internet.

Step 604 receives the communicated text string associated with the user's search query. Step 606 searches for information associated with the received text string. This step can be performed in any way. For example, the step can be performed by searching for non-textual information associated with the received text string. Alternately or additionally, the step can be performed by searching for textual information as well as non-textual information.

Step 608 communicates the information to the client. The step can be performed in any suitable way using any suitable protocol. In addition, the information can be communicated to the client using any suitable format. But one example of a suitable format is provided below in the section entitled "Specifying Content to Be Displayed in a Search Box".

Step 610 receives the information communicated from the search provider. Step 612 renders the information in a search box drop down menu. One example of how this can be done is provided above in connection with FIG. 5. In addition, once a particular misspelled search term has been identified and associated information has been rendered, a user can select the correctly-spelled search term which can then be processed as described in FIG. 4.

Specifying Content to be Displayed in a Search Box

In one or more embodiments, search providers can specify, to a Web browser, parameters that define content that is to be displayed in a search box drop down menu. In at least some embodiments, a content definition is provided using an XML schema that can define through parameters or tags, how many sections to display, section titles, as well as what to display in each particular section.

As an example, consider the XML excerpt shown just below:

```
<?xml version="1.0"?>
<SearchSuggestion version="2.0"
xmlns="http://opensearch.org/searchsuggest2">
    <Query>seatle</Query>
    <spelling>
        <misspell>seatle</misspell>
        <corrected>Seattle</corrected>
    </spelling>
    <Section title="Suggestions from WindowsLive Search">
        <Item>
            <Image height=x width=y source=URL
        alt="alt text" />
            <Text>text to display</Text>
            <Url>URL</Url>
            <Description>description
text</Description>
        </Item>
    </Section>
</SearchSuggestion>
```

In this example, the XML excerpt includes a <Query> tag that identifies the search query entered by the user. In addition, in this particular example, a <spelling> tag indicates a misspelled phrase as well as corrected phrase. Further, a <Section> tag provides the search provider with an opportunity to suggest individual sections that can be displayed in a search box drop down menu, as well as titles of the sections. Further, in at least some embodiments, individual items such as images, text, URLs, and/or a description can be specified in the XML.

In at least some embodiments, the content definition can define multiple different sections to display, section titles, as well as what to display in each particular section.

Figure 7:
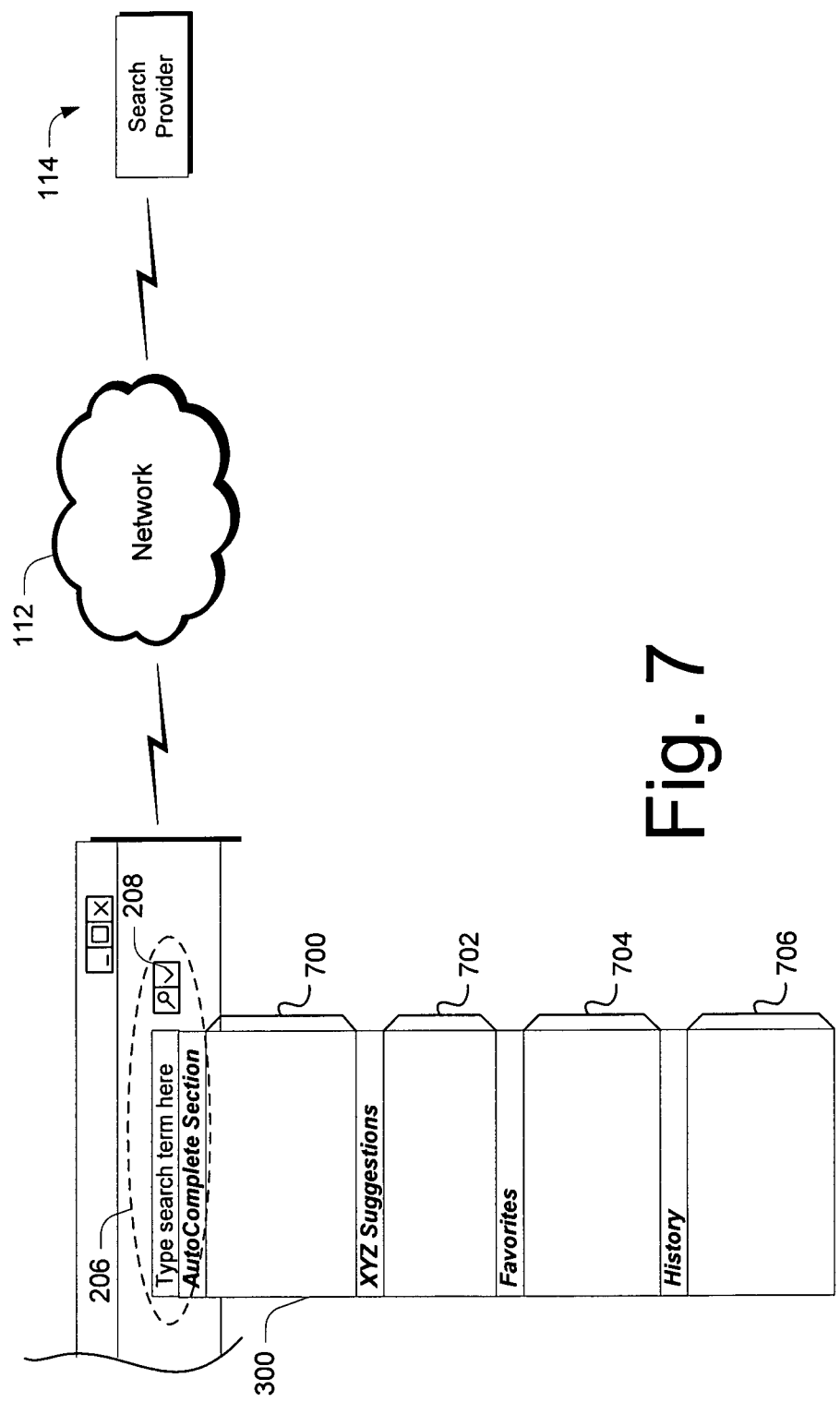
FIG. 7 illustrates a user interface along with a system in accordance with one or more embodiments.

FIG. 7 illustrates an example search box 206 having a drop down menu 300. In this example, multiple different sections are defined and include sections 700, 702, 704, and 706. Section 700 is an auto-complete section, section 702 is a suggestion section, section 704 is a favorites section, and section 706 is a history section.

The auto-complete section 700 enables the Web browser to list links to which a user navigated when they last entered a search term in the search box. In operation, the Web browser maintains a list of landing pages or pages to which a user navigated when they conducted a previous search. In the event that the user enters a search query that matches with at least a portion of the previous search query, links to which the user previously navigated can be listed for the user. This enables the user to locate previous landing pages without having to conduct a search for them.

The suggestion section 702 enables third-party providers to provide information, including non-textual information, for the user to review responsive to entering a search query in the search box 206. In one or more embodiments, as described above, search providers can provide information for partial text strings associated with a user's search query. In addition, in at least some embodiments, the search providers can provide definitional information that defines how many sections to display, section titles, as well as what to display in each particular section. In at least some of these embodiments, rendering decisions on how particular information is to be displayed can be made by the rendering device and/or Web browser. This can permit third party providers to specify the information is to be displayed and, at the same time, can accommodate different form factor devices by leaving rendering decisions up to the device and/or applications executing on the device.

The favorites section 704 enables various favorites that are saved locally to be displayed for the user when the favorites are found to be associated with a search query or portion thereof entered by a user.

The history section 706 enables a various history items that are saved locally to be displayed for the user when the history items are found to be associated with a search query or portion thereof entered by user.

Figure 8:
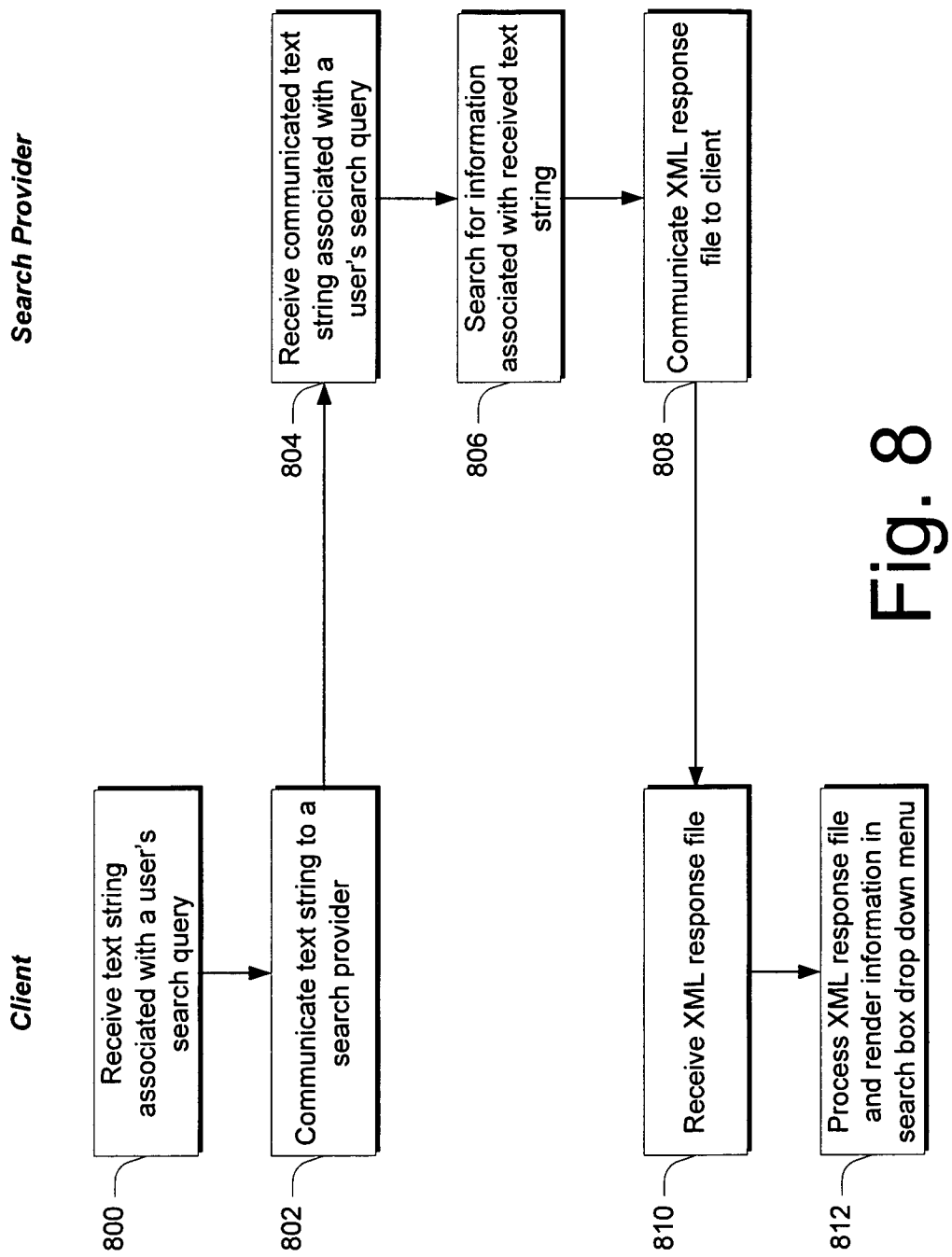
FIG. 8 is a flow diagram that describes steps in a method in accordance with one or more embodiments.

FIG. 8 is a flow diagram that describes steps in a method in accordance with one or more embodiments. The method can be implemented in connection with any suitable hardware, software, firmware or combination thereof. In at least some embodiments, aspects of the method can be implemented by an application, such as a suitably configured Web browser executing on a client device. In addition, aspects of the method can be implemented by one or more search providers. Typically, the search providers are third-party search providers accessible via a suitable network such as the Internet.

Step 800 receives a text string associated with a user's search query. In one or more embodiments, this step is performed, at least in part, using a search box that comprises part of a Web browser. In one or more embodiments, the search box comprises a native part of the Web browser. That is, in these embodiments, the search box functionality is not provided by a separately-installed tool bar mechanism. In addition, the text string can include less than an entire portion of a user's search query. One example of a suitable search box is described above in connection with FIG. 7.

Step 802 communicates the text string to a search provider. This step can be accomplished in any suitable way using any suitable protocol. At least some embodiments, this step is performed by communicating the text string to the search provider via a network such as the Internet.

Step 804 receives the communicated text string associated with the user's search query. Step 806 searches for information associated with the received text string. This step can be performed in any way. For example, the step can be performed by searching for non-textual information associated with the received text string. Alternately or additionally, the step can be performed by searching for textual information as well as non-textual information. Further, this step can be performed by searching for information associated with a particular user and/or by searching for information across a collection of users.

Step 808 communicates an XML response file to the client. This step can be performed in any suitable way using any suitable protocol. An example XML response file is provided above. In one or more embodiments, a third-party provider can specify, in the XML response file, one or more parameters that describe what is to be displayed in the search box drop down menu. For example, search providers can describe how many sections to display, what label to give a particular section, and/or what order to place the sections.

Step 810 receives the XML response file and step 812 processes the XML response file and renders information in the search box drop down menu.

Suggesting Landing Pages from Previous Searches

In one or more embodiments, a Web browser can be configured to suggest so called landing pages from previous searches that a user performed. Specifically, as a user is browsing the Web they often repeat searches looking for the same page that they visited in the past. The browser can help the user in these cases by "remembering" what sites, i.e. landing pages, the user went to after they did a search and then present this information to the user while they are composing new queries in the search box.

In operation, the Web browser can recognize when the user is on a search results page. That is, based on the providers that the user has installed in their browser, e.g. as a tool bar such as the one shown in FIG. 2 at 204, the browser can recognize that the user is on a search results page because portions of the URL of the search results pages will match portions of an URL associated with one of the user's installed providers in a very specific manner. Specifically, both URLs will have the same hostname and also will have a parameter which contains the search query term. Once the browser recognizes that the user is on a search results page, then the browser can track what links the user goes to from that page and store that as additional tags on history items. Then, while the user is typing in the search box, the browser can recommend an auto-complete term based on the query entered in the search box. That is, the browser can search for pages from the user's history which are associated with that term and display those to the user for selection.

FIG. 9 is a flow diagram that describes steps in a method in accordance with one or more embodiments. The method can be implemented in connection with any suitable hardware, software, firmware or combination thereof. In at least some embodiments, aspects of the method can be implemented by an application, such as a suitably configured Web browser executing on a client device.

Step 900 ascertains that a user has conducted a search and is on a search provider results page. Examples of how this can be done are provided above. Step 902 tracks which links the user navigates to from the search provider results page. An example of how this can be done is provided above. Step 904 receives a text string associated with a user's search query. This step can be performed by receiving a text string via a search box that is provided as a native part of a Web browser. An example of such a search box is provided above in FIG. 7 at 206. Step 906 recommends one or more links based on links to which the user has navigated in the past. This step can be performed by recommending links to which a user navigated from a search provider's results page.

In addition, in one or more embodiments, when a user enters a search query in a third party provider's search box, that term can be replicated in the browser's search box to enable the user to search across multiple providers and to have suggestions displayed for them in the manner described above. Accordingly, searches that are performed in third party providers' search boxes can be synchronized with the browser's own search box.

FIG. 10 is a flow diagram that describes steps in a method in accordance with one or more embodiments. The method can be implemented in connection with any suitable hardware, software, firmware or combination thereof. In at least some embodiments, aspects of the method can be implemented by an application, such as a suitably configured Web browser executing on a client device.

Step 1000 receives a text string that a user has entered in a third-party search provider search box. An example of such a search box is provided in FIG. 2 at 204. Step 1002 replicates the text string in a native Web browser search box. An example of such a search box is provided above. Step 1004 provides, via the native Web browser search box, one or more suggestions associated with the replicated text string. Examples of how suggestions can be provided are given above.

Example System

Figure 11:
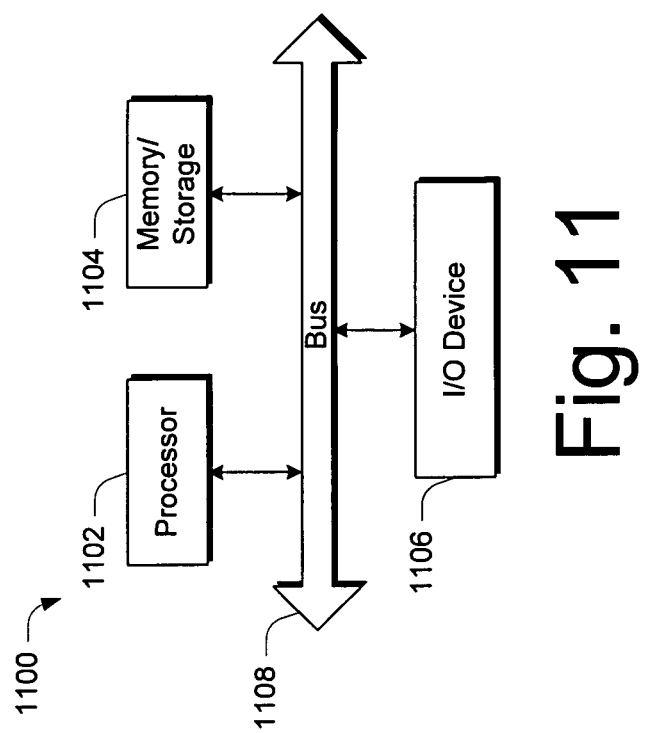
FIG. 11 illustrates an example system that can be used to implement one or more embodiments.

FIG. 11 illustrates an example computing device 1100 that can implement the various embodiments described above. Computing device 1100 can be, for example, computing device 102 of FIG. 1 or any other suitable computing device.

Computing device 1100 includes one or more processors or processing units 1102, one or more memory and/or storage components 1104, one or more input/output (I/O) devices 1106, and a bus 1108 that allows the various components and devices to communicate with one another. Bus 1108 represents one or more of any of several types of bus structures, including a memory bus or memory controller, a peripheral bus, an accelerated graphics port, and a processor or local bus using any of a variety of bus architectures. Bus 1108 can include wired and/or wireless buses.

Memory/storage component 1104 represents one or more computer storage media. Component 1104 can include volatile media (such as random access memory (RAM)) and/or nonvolatile media (such as read only memory (ROM), Flash memory, optical disks, magnetic disks, and so forth). Component 1104 can include fixed media (e.g., RAM, ROM, a fixed hard drive, etc.) as well as removable media (e.g., a Flash memory drive, a removable hard drive, an optical disk, and so forth).

One or more input/output devices 1106 allow a user to enter commands and information to computing device 1100, and also allow information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media".

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Conclusion

Various embodiments enable information, in addition to textual information, to be presented to a user when the user enters a search query in a search box forming part of a user interface of an application. In one or more embodiments, a Web browser provides a search box in which a user can enter a search query. While the user is entering a search query, the Web browser can communicate with a third-party search provider to receive information, such as non-textual information, which can be presented to the user to assist in formulating their search query. The non-textual information can include images and other visual information of a non-textual nature.

In at least some embodiments, non-textual information can be received from a search provider to provide an indication to a user that a search query term may be misspelled. Further, in at least some embodiments, search providers can specify, to a Web browser, parameters that define content that is to be displayed in a search box drop down menu. In at least some embodiments, a content definition is provided using an XML schema that can define how many sections to display, section titles, as well as what to display in each particular section.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method comprising:
   receiving, via a search box comprising a native part of a Web browser, a text string associated with a user's search query, the search box not provided by a separately-installed mechanism;
   communicating the text string to a search provider;
   receiving information communicated from the search provider, wherein said information includes at least non-textual information;
   rendering said information in a search box drop down menu associated with said search box, wherein rendering includes rendering in the search box drop down menu at least some locally acquired information, wherein the locally acquired information comprises links associated with the user's search query;
   receiving a text string that the user has entered in a third-party search provider search box;
   replicating the text string entered in the third-party search provider search box in the search box comprising the native part of the Web browser; and
   providing, via the search box comprising the native part of the Web browser, one or more suggestions associated with said replicated text string.

2. The method of claim 1, wherein the text string received via the search box comprising a native part of the Web browser includes less than an entire portion of a user's search query.

3. The method of claim 1, wherein said communicating is performed by communicating the text string received via the search box comprising a native part of the Web browser to the search provider via the Internet.

4. The method of claim 1, wherein said communicating includes communicating information that identifies a particular user or client device.

5. The method of claim 1, wherein said non-textual information includes one or more images.

6. The method of claim 1, wherein said non-textual information includes information to provide an indication to the user that a search query term may be misspelled.

7. The method of claim 6, wherein said information to provide an indication to the user that a search query term may be misspelled comprises color-coded information.

8. The method of claim 1, wherein said information includes textual information.

9. One or more computer-readable non-volatile storage embodying computer-readable instructions which, responsive to execution by at least one processor, are configured to:
receive, via a search box comprising a native part of a Web browser, a text string associated with a user's search query, the search box not provided by a separately-installed tool bar mechanism;
communicate the text string to a search provider via the Internet;
receive, from the search provider, a response file that includes one or more parameters that describe information to be displayed in a search box drop down menu, the one or more parameters describing one or more of: sections to display, labels for a particular section, or an order of sections;
process the response file and render the information in the search box drop down menu, wherein the computer-executable instructions to render are further configured to render in the search drop down menu at least some locally acquired information, wherein the locally acquired information comprises links associated with the user's search query;
receive a text string entered in a third-party search provider search box;
replicate the text string entered in a third-party search provider search box in the search box comprising the native part of the Web browser; and
provide, via the search box comprising the native part of the Web browser, one or more suggestions associated with said replicated text string.

10. The one or more computer-readable non-volatile storage of claim 9, wherein the response file comprises an XML file.

11. The one or more computer-readable non-volatile storage of claim 9, wherein the text string received via the search box comprising the native part of the Web browser includes less than an entire portion of a search query.

12. The one or more computer-readable non-volatile storage of claim 9, wherein the one or more parameters comprise a parameter associated with a misspelled search query.

13. The one or more computer-readable non-volatile storage of claim 12, wherein the parameter associated with a misspelled search query comprises color-coded information.

14. The one or more computer-readable non-volatile storage of claim 9, wherein the one or more parameters comprise a parameter associated with an image that can be displayed in the search box drop down menu.

15. The one or more computer-readable non-volatile storage of claim 9, wherein the one or more parameters comprise a parameter associated with an URL that can be displayed in the search box drop down menu.

16. A system comprising:
one or more computer-readable storage memories;
computer-readable instructions embodied on the one or more computer-readable storage memories, the instructions providing a Web browser configured to:
ascertain that a user has conducted a search and is on a search provider results page;
track, locally, which links the user navigates to from the search provider results page;
receive, via a search box comprising a native part of the Web browser, a text string associated with a user's search query, the search box not provided by a separately-installed mechanism;
recommend, locally, one or more links based on locally tracked links to which the user has navigated in the past using the search provider results page;
receive a text string that the user has entered in a third-party search provider search box;
replicate the text string in the search box comprising the native part of the Web browser; and
provide, via the search box comprising the native part of the Web browser, one or more suggestions associated with a replicated text string.

17. The system of claim 16, wherein the Web browser is configured to ascertain that a user has conducted a search by recognizing that portions of an URL associated with a search provider's results page match portions of an URL associated with a user-installed search provider.

18. The method of claim 1, wherein the locally acquired information is user-associated information.

19. The method of claim 18, wherein the user-associated information includes user history items associated with the search query.

20. The method of claim 18, wherein the user-associated information is configured to include user-favorites items associated with the search query.

21. The method of claim 18, wherein the user-associated information is configured to include user history and user-favorites items associated with the search query.

22. The one or more computer-readable non-volatile storage of claim 9, wherein the locally acquired information is user-associated information.

23. The one or more computer-readable non-volatile storage of claim 22, wherein the user-associated information includes user history items associated with the search query.

24. The one or more computer-readable non-volatile storage of claim 22, wherein the user-associated information is configured to include user-favorites items associated with the search query.

* * * * *